United States Patent [19]

LaVoie

[11] 4,236,746
[45] Dec. 2, 1980

[54] STOP FOR VEHICLE LICENSE PLATE MOUNTING BRACKET

[76] Inventor: Richard LaVoie, 1N411 Park Blvd., Glen Ellyn, Ill. 60137

[21] Appl. No.: 33,874

[22] Filed: Apr. 27, 1979

[51] Int. Cl.³ ............................................. B62D 25/00
[52] U.S. Cl. .................................... 296/1 C; 220/335; 220/339
[58] Field of Search ........... 296/1 C; 217/60 E, 60 B, 217/60 R, 61; 220/335, 339, 326

[56] References Cited

U.S. PATENT DOCUMENTS

| | | | |
|---|---|---|---|
| 2,760,811 | 8/1956 | Basferd | 296/1 C |
| 3,008,754 | 11/1961 | Fiala | 296/1 C |
| 3,131,000 | 4/1964 | Pierce | 296/1 C |
| 3,905,637 | 9/1975 | Smith | 296/1 C |
| 3,915,491 | 10/1975 | Montgomery | 296/1 C |

Primary Examiner—Richard A. Bertsch
Attorney, Agent, or Firm—Darbo & Vandenburgh

[57] ABSTRACT

A stop for holding a normally vertically oriented vehicle license plate mounting bracket in a substantially horizontal position against spring pressure to provide access to the gasoline tank inlet of the vehicle. The stop includes a flat "U"-shaped frame having at least one wing which normally lies between the frame legs in the plane of the frame hingedly secured to one of the frame legs. When the frame is secured to a license plate mounting bracket on the side thereof which abuts the vehicle body, and when the license plate mounting bracket is withdrawn from the vertical to the horizontal, the wing may be pivoted about its hinge to abut the vehicle and maintain the license plate mounting bracket in the horizontal position against spring pressure of the mounting bracket.

7 Claims, 7 Drawing Figures

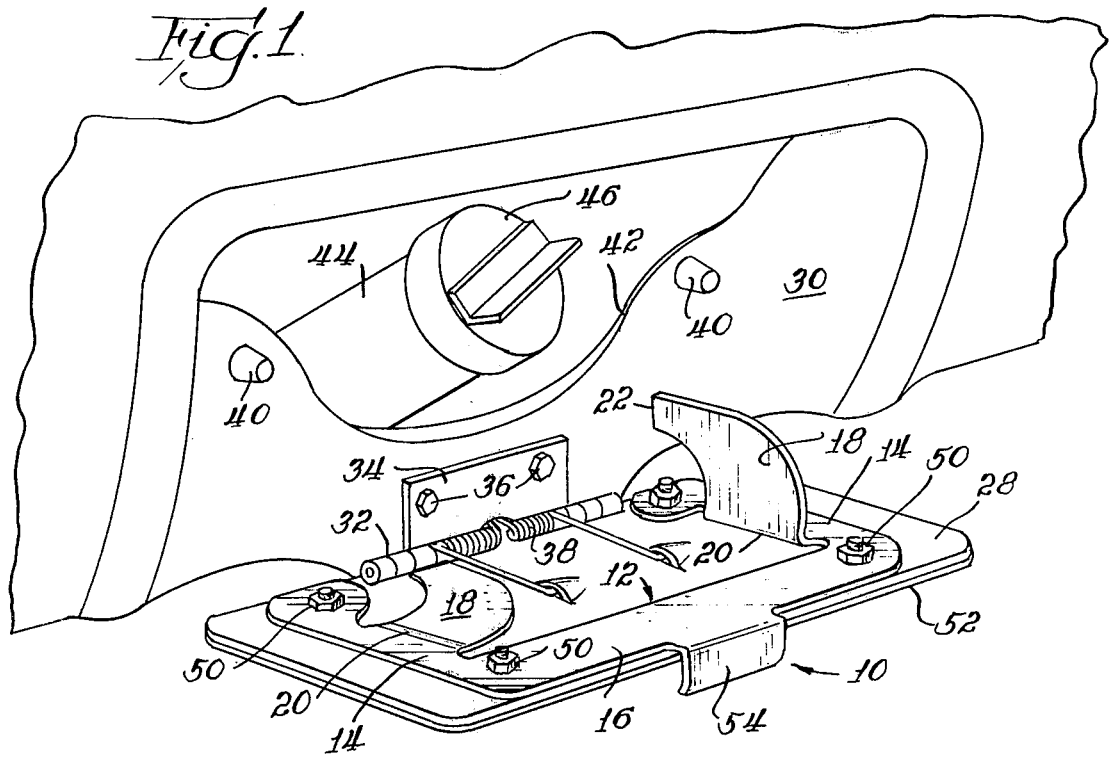
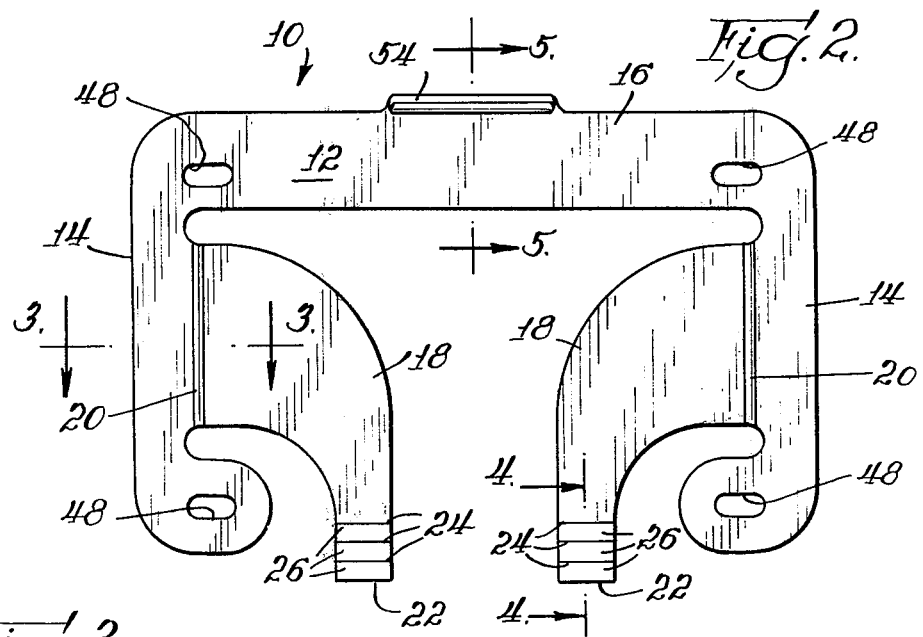
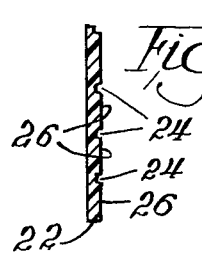
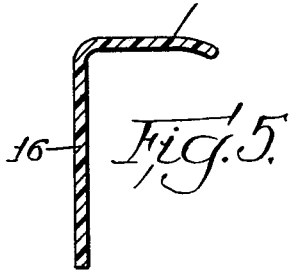

STOP FOR VEHICLE LICENSE PLATE MOUNTING BRACKET

SUMMARY OF THE INVENTION

The Background

This invention relates to devices for restraining closure of a spring biased vehicle license plate mounting bracket, and more particularly the invention relates to a hinged attachment for a license plate mounting bracket which facilitates horizontal retention of the license plate mounting bracket during fueling of the vehicle.

In many, and perhaps the majority of, automobiles, the fuel tank is filled through an inlet tube which opens at the rear of the automobile behind the bracket provided for mounting of the rear license plate. The inlet tube is closed by a removable gas cap and the mounting bracket is hingedly mounted, usually at the bottom of the mounting bracket, covering the gas cap and, so that the bracket must be drawn out of the way to provide access to the fuel tank inlet tube. Spring pressure is provided to urge the mounting bracket to its normal upright position covering the gas cap so that when the mounting bracket has been withdrawn to the horizontal position, it must be held in that position while the gas cap is removed and the nozzle of a gasoline hose is inserted into the inlet tube. This awkward operating procedure requires both hands and has been exacerbated by the advent of self-service filling stations. An inexperienced person usually fuels his automobile in a two-step operation, the first being to crouch down and remove the gas cap after the license plate mounting bracket is withdrawn to the horizontal position. After the gas cap is removed, the user normally must stand up and return to the gasoline pump to obtain the hose and nozzle, permitting the mounting bracket to return to its vertical position. It is then necessary to again withdraw the mounting bracket to the horizontal position and hold it open with one hand while the nozzle is inserted by the other hand. During fueling, the license plate bracket normally is allowed to bear against the gasoline nozzle, but thereafter, the sequence of operation is repeated in reverse in order to replace the gas cap.

The prior art has recognized the awkward procedure required to fuel a vehicle having its license plate mounting bracket situated over the fuel tank access tube. For example, U.S. Pat. No. 3,131,000 has disclosed a device for utilizing the gasoline cap in combination with the license plate mounting bracket to hold the mounting bracket in the horizontal position. U.S. Pat. No. 2,760,811 discloses a catch for the hinge of the license plate mounting bracket which retains the mounting bracket in the horizontal position. U.S. Pat. No. 3,008,758 discloses a mounting bracket spring which loses tension when the license plate mounting bracket is fully opened. U.S. Pat. No. 3,905,637 discloses an attachment for mounting upon the vehicle license plate bracket which has a pivotal finger which may be rotated to abut the vehicle body when the license plate mounting bracket is lowered to the horizontal position, thereby preventing return of the mounting bracket to the vertical position until the finger is rotated to a non-engaging position.

Although the prior art has recognized the need of a device for holding the spring-biased license plate mounting bracket out of the way while the vehicle is being fueled, such prior art devices suffer several deficiencies. For example, the device of U.S. Pat. No. 3,905,637 must be pressed against the vehicle body and can therefore slip and be easily damaged. Furthermore, the device must be specially affixed to the license plate mounting bracket and may be mounted on only one side of the mounting bracket, often interfering with the gasoline filling nozzle and hose. In addition, since the finger is pivotal about a rivet, the finger can easily be sheared from the remainder of the device during rough usage.

The Invention

These and other disadvantages of the prior art, which will become more apparent by comparison in the description following, are overcome by the present invention which provides a simple, reliable stop for holding a normally vertically oriented vehicle license plate mounting bracket in a horizontal position against spring pressure exerted by the spring-biased hinge of the mounting bracket.

In accordance with the invention, a stop is provided for mounting on the vehicle license plate mounting bracket on the side of the mounting bracket which closes against the body of the vehicle when the mounting bracket is situated in the normal, upright position. The stop comprises a flat frame having a pair of spaced, parallel legs which are suitably interconnected. At least one wing is located between the frame legs, and is secured by a hinged end to the frame, normally lying in the plane of the frame. Thus, when the license plate mounting bracket is withdrawn from the vertical position to the horizontal position, the wing may be pivoted about its hinge to engage the body of the vehicle and maintain the license plate mounting bracket in the horizontal position against the spring pressure while the vehicle is being fueled.

Preferably, the legs of the frame are interconnected by a yoke strip which extends between the tops of the legs, preferably integral therewith, to form an inverted "U"-shaped bracket. One or more holes are provided in each of the frame legs to accommodate appropriate fasteners to attach the frame to the mounting bracket. In order to simplify installation of the frame, it is advantageous to provide holes that are located in registration with the usual holes in the license plate mounting bracket through which the license plate is fastened. In this manner, fasteners used to affix the license plate to the mounting bracket may at the same time serve to affix the frame to the mounting bracket.

In order to provide adjustability of the stop and adaptability to various automobile models, preferably the wings are scored near their free ends so that the tips of the wings may be removed by severing the wing along the score lines.

A tab is provided at the edge of the frame remote from the mounting bracket hinge mounting and is shaped to protrude outwardly over one edge of the license plate mounting bracket in order to facilitate withdrawal of the mounting bracket from the vertical to the horizontal position.

BRIEF DESCRIPTION OF THE DRAWINGS

The features of the invention will become more readily apparent from the following description and drawings, in which:

FIG. 1 is a perspective view of the stop according to the invention secured to a license plate mounting bracket and using one wing, holding the mounting bracket in the horizontal position;

FIG. 2 is an enlarged top plan view of the stop according to the invention;

FIGS. 3, 4 and 5 are detail views, in cross-section, taken along line 3—3, 4—4 and 5—5, respectively, of FIG. 2;

DESCRIPTION OF THE PREFERRED EMBODIMENT

Figure 6:
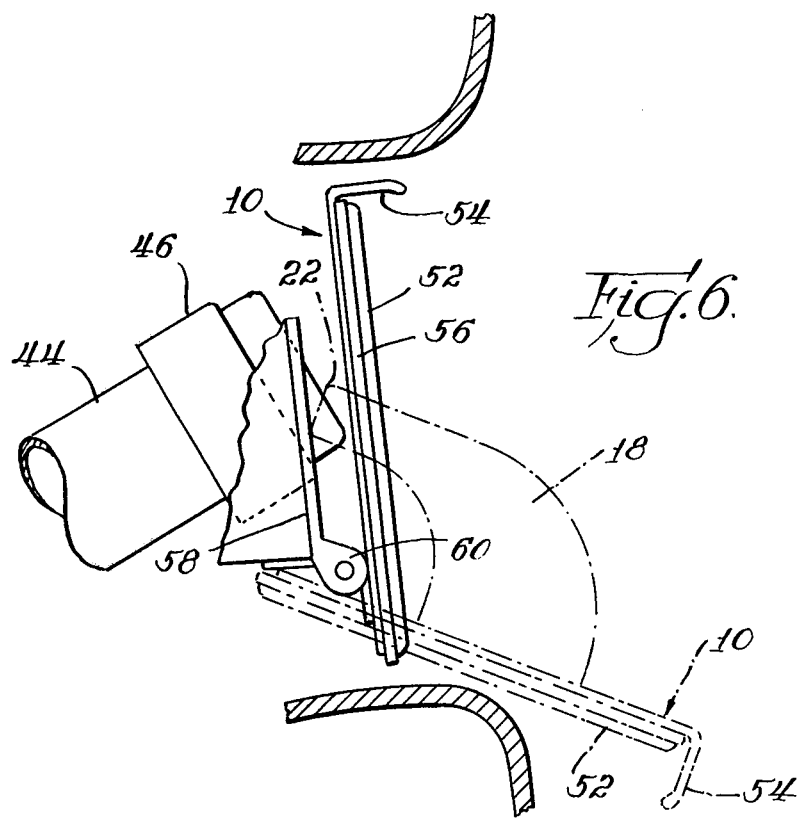
FIG. 6 is a side elevational illustration of the stop according to the invention when secured to a vehicle license plate mounting bracket in normal position covering the gas tank inlet tube and showing in phantom deployment of the stop to hold the license plate mounting bracket in the horizontal position.

A stop according to the invention is shown in the drawing generally at 10. It comprises a frame 12 having a pair of spaced, parallel legs 14 and a yoke strip 16 connecting the legs 14 at the top ends thereof. A pair of wings 18 are respectively attached to the frame 16 along the inner edges of the legs 14. Attachment is by means of hinges 20, best shown in FIGS. 2 and 3. Preferably, the entire stop 10 is integrally formed of a moderately resilient material, such as a suitable plastic, and the hinge 20 is molded into the stop 10 as a living hinge, as shown in FIG. 3. Alternatively, the wings 18 may be hingedly secured to the legs 14 in any conventional manner.

As shown in FIGS. 2 and 4, each wing 18 is impressed with a series of spaced scores 24 near the free end 22. The scores 24 define a series of potential wing tips 26 any one of which may be rendered operative by severing from the wing 18 the portion beyond the score which provides the desired length of the wing. Thus, the stop 10 can be made adaptable to various automobile models by merely severing the wing extremities at an appropriate score.

As shown in FIG. 1, the stop 10 is formed to be readily securable to a license plate mounting bracket 28. As illustrated, the bracket 28 is hingedly secured to a vehicle body or bumper 30 by a hinge 32. The hinge 32 includes a hinge plate 34 affixed to the body 30 by a pair of bolts 36. A spring 38 is anchored between the hinge plate 34 and the mounting bracket 28 to normally urge the mounting bracket toward a vertical position substantially coextensive with the vehicle body 30. A pair of resilient bumpers 40 are normally provided on the vehicle body 30 to receive the mounting bracket 28 thereagainst when it is in an upright position.

An opening 42 is located in the vehicle body 30 to allow access to an inlet tube 44 to a fuel tank (not illustrated). As is conventional, the inlet tube 44 is closed by a gas cap 46.

The stop 10 is provided with a series of holes 48 to assist attachment of the stop to the mounting bracket 28. As shown in FIG. 1, the holes 48 are appropriately positioned and the legs 14 are separated sufficiently so that the holes 48 are in registration with holes (not shown) provided in the mounting bracket 28, through which bolts 50 may pass to affix a license plate 52 to the mounting bracket 28. Thus, as shown in FIG. 1, the bolts 50 may be used to secure both the license plate 52 and the stop 10 to the mounting bracket 28.

As shown in FIG. 1, to hold the mounting bracket 28 in a generally horizontal position, one of the wings 18 is raised to a position at approximately a right angle to the bracket at which the free end 22 approaches the vehicle body 30. The spring 38 is thereby prevented from raising the mounting bracket 28 to the vertical position at which it would prevent access to the gasoline cap 46.

To facilitate withdrawal of the mounting bracket 28 to the horizontal position as shown in FIG. 1, the stop 10 may include a tab or handle 54 extending from the top edge of yoke strip 16 and protruding outwardly over the top edge of the license plate mounting bracket 16 as shown.

Figure 7:
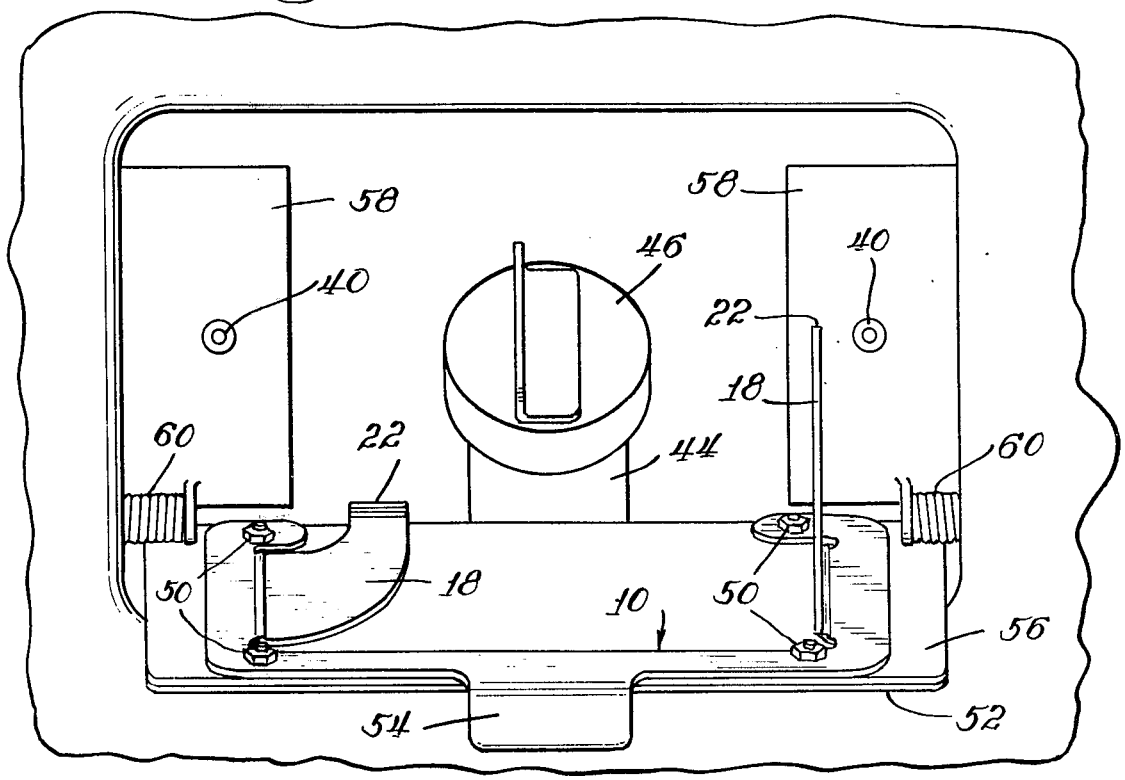
FIG. 7 is a front elevational illustration showing employment of the stop according to the invention.

FIGS. 6 and 7 illustrate elevation of the stop 10 as described above in association with a vehicle body and mounting bracket slightly different from the arrangement shown in FIG. 1. As illustrated, the stop 10 is attached to a mounting bracket 56 which is affixed to a vehicle body 58 by means of a pair of spring hinges 60. As the spring 38 in FIG. 1, the spring hinges 60 urge the mounting bracket 56 to the normally vertical position shown in solid lines in FIG. 6, preventing access to the gas cap 46. Bolts 50 are used to secure the license plate 52 and stop 10 to the mounting bracket 56 in precisely the same manner as described above with regard to FIG. 1.

The stop 10, with one of the wings 18 deployed, is shown in FIG. 7 (and in phantom in FIG. 6), holding the license plate bracket 56 in the substantially horizontal position to permit access to the gas cap 46. One wing 18 has been raised and has its free end 22 abutting the vehicle body 58, maintaining the mounting bracket 56 in the horizontal position against the spring pressure of the spring hinges 60.

The stop 10 is used as follows. First, it is secured to the license plate mounting bracket as shown in FIGS. 1, 6 and 7 by the license plate mounting fasteners 50 already provided for attaching the license plate 52 to the license plate mounting bracket. One or more wing tip elements 26 may be removed if necessary to adjust to conditions either before or after the stop is fastened to the supporting bracket. The license plate assembly is permitted to return to its normal position covering the gas cap. Thereafter, to fuel the automobile, the user grasps the tab 54 and withdraws the mounting bracket from the vertical to the generally horizontal position. Then, one or both of the wings 18 are raised with the free ends 22 in position to engage the vehicle body. When the license plate mounting bracket is then released, it is held in open position by the stop and the user may remove the gasoline cap 46 and fuel the automobile without the necessity of having to use one hand to hold the license plate mounting bracket in the horizontal position. After the vehicle is fueled, the gasoline cap 46 is returned to the inlet tube 44 and the wings 18 are returned to their normal positions coextensive with the plane of the frame 12. The spring force of the mounting bracket springs then urge the mounting bracket to the vertical position against the bumpers 40.

Normally, only one of the wings 18 need be deployed to retain the license plate mounting bracket in the horizontal position. Usually, the user will find it most convenient to deploy that wing which is most distant from the fuel pump. The other wing is maintained in its rest position and therefore does not interfere with the gasoline nozzle or hose during the fueling operation. In the event that one of the wings is broken or broken off at its hinge, the remaining wings can continue to serve the purpose of the stop.

Various modifications may be made to my invention without departing from the spirit thereof or scope of the following claims.

I claim:

1. A stop for holding a normally vertically oriented spring hinge mounted vehicle license plate mounting bracket in a substantially horizontal position against spring pressure, the mounting bracket being spring biased toward the normal vertical position with one side confronting the body of the vehicle and the other side having a license plate affixed thereto, and being hinged to facilitate pivoting from the vertical position to the horizontal position, the stop comprising:

a flat frame adapted to be fastened to said one side of the license plate mounting bracket, said frame comprising a pair of spaced, parallel frame legs and a yoke strip connecting said frame legs to form an inverted "U"-shaped frame, means for securing said frame to the mounting bracket, and at least one wing located between said frame legs and having a hinged and a free end, and being secured by a hinge at said hinged end to said frame, said wing and said hinge normally lying in the plane of said frame, whereby when the license plate mounting bracket is withdrawn from the vertical position to the horizontal position, said wing may be pivoted about said hinge to engage said free end with the body of the vehicle and maintain the license plate mounting bracket in the horizontal position.

2. A stop according to claim 1 in which said yoke strip is integral with said frame legs and said "U"-shaped frame is a unitary part of the stop.

3. A stop according to claim 1 wherein the license plate mounting bracket is provided with license plate mounting holes and wherein said "U"-shaped frame is provided with holes registering with said holes in the license plate mounting bracket, whereby the same fasteners may be used to attach both said frame and a license plate to the mounting bracket.

4. A stop according to claim 1 having two said wings wherein each said wing is secured to one of said frame legs by said hinge.

5. A stop according to claim 4 in which each said hinge is formed from the material of and comprises an integral portion of said wing and said associated frame leg.

6. A stop according to claim 1 including at least one score in said wing near said free end, said score and said free end defining a removable wing tip such that said wing tip may be severed from said wing along said score to shorten said wing.

7. A stop according to claim 1 including a tab attached to said yoke strip, said tab extending transversely to the plane of said frame and shaped to protrude outwardly over one edge of the license plate mounting bracket to facilitate grasping and withdrawal of the mounting bracket from the vertical to the horizontal when said stop is secured to the mounting bracket.

* * * * *